Figure 1:
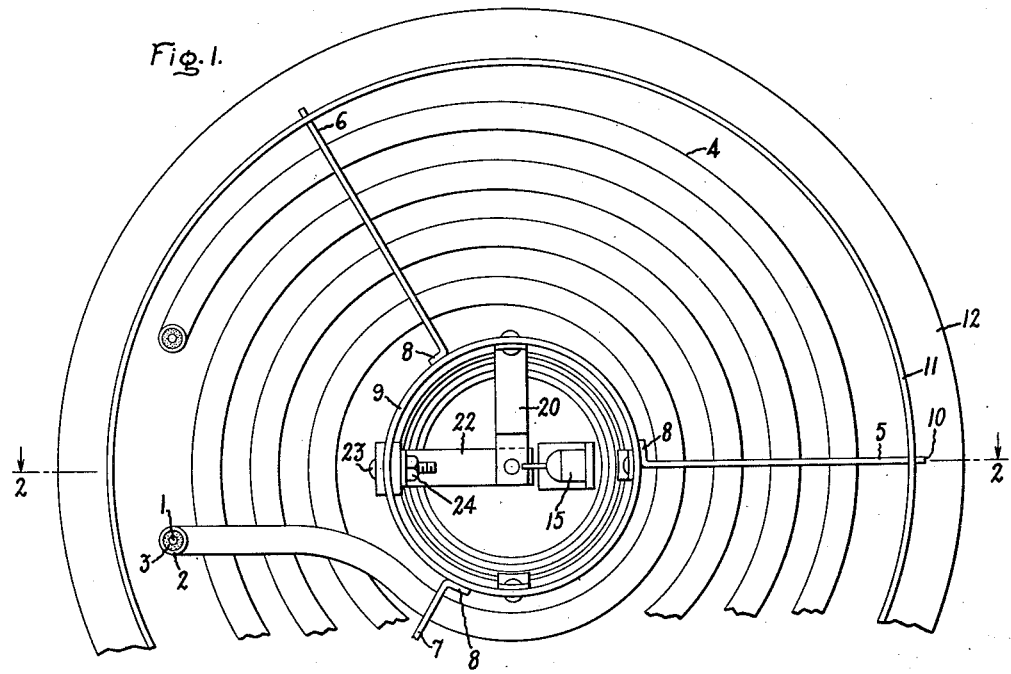

July 1, 1952   J. F. YOUNG   2,602,132
RANGE HEATER AND CONTROL
Filed Dec. 24, 1949   2 SHEETS—SHEET 1

Inventor:
James F. Young,
by *[signature]*
His Attorney.

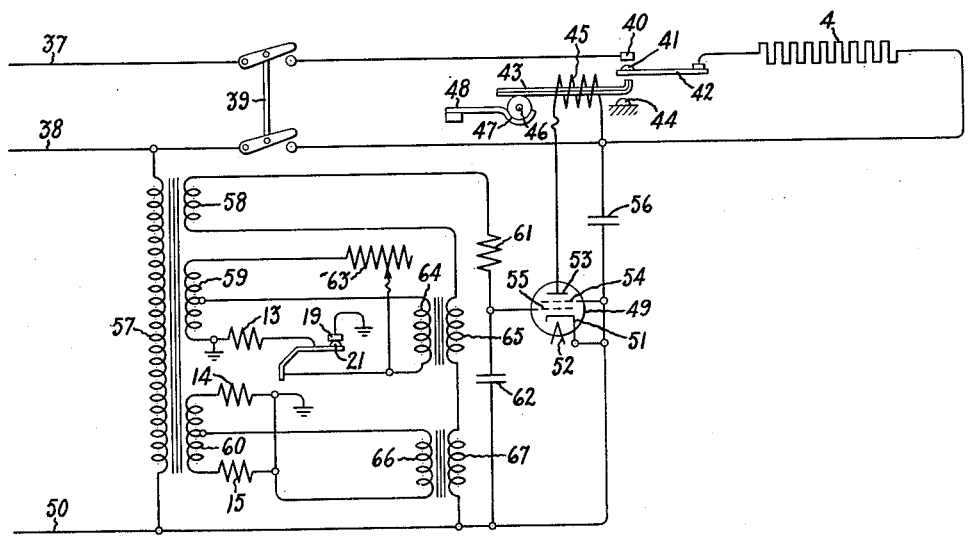
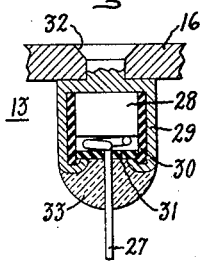
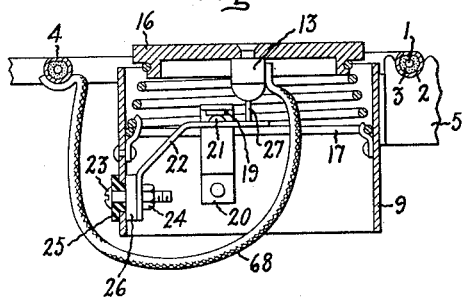

Patented July 1, 1952

2,602,132

UNITED STATES PATENT OFFICE 2,602,132

RANGE HEATER AND CONTROL

James F. Young, Bridgeport, Conn., assignor to General Electric Company, a corporation of New York Application December 24, 1949, Serial No. 135,015

3 Claims. (Cl. 219—20)

This invention relates to automatically controlled heating devices, and more particularly to surface heating units for cooking appliances with an automatic temperature control.

In the process of cooking on surface heating units, particularly in connection with electric ranges, it is often necessary to adjust the input to the heating unit several times so that the desired uniform cooking temperature is maintained. In every instance, it is preferable if the cooking utensil is initially heated quickly to the proper operating temperature. Thus, a person using an electric range frequently turns a heating unit on to the highest available rate of heating to bring the cooking vessel up to the desired temperature, after which a lower rate of heating is selected to maintain the proper temperature. However, it is found that if the operator waits until the cooking utensil reaches the desired temperature before switching to a lower rate of heating, there is often serious overshoot of the desired temperature causing burning of foods or smoking of fats. This is due to the fact that the heating unit itself heats up more rapidly than the cooking utensil, and, because of its relatively high thermal mass, it continues to supply heat to a utensil for a period of time after it is turned off or to a lower heat. In addition, it is found that the extent of overshoot depends upon several variable factors. For example, in boiling operations, pressure cooking, and heating of deep fats, little if any overshoot occurs since in each case a large heating load is involved and the additional input after the heating unit is shut off makes relatively little difference in the temperature of the vessel or its contents. Alternatively, operations such as griddling and frying which present a much smaller heat load require considerable anticipation in turning off the heating unit if serious temperature overshoot is to be avoided. In addition, the type of pan employed has an influence. For example, cast iron, being a poorer conductor, needs more anticipation than aluminum, a good thermal conductor.

It is, therefore, a primary object of my invention to provide an automatic temperature control for a heating unit of a cooking appliance arranged to bring any cooking utensil quickly up to a preselected temperature and thereafter maintain that temperature within narrow limits.

A further object of my invention is to construct such an automatic temperature control which anticipates the extent of overshoot which may occur and thereby shut off the unit prior to arrival at the preselected temperature.

Another object of my invention is to arrange an automatically controlled electric heating unit which is self-compensating with respect to the extent of the heat load involved and to the relative thermal conductivity of the material making up the cooking utensil.

In accomplishment of the foregoing objectives, I employ a thermally sensitive resistor having a very large temperature coefficient of resistance oriented in a manner so that it is principally sensitive to the temperature of a cooking utensil resting on the heating unit. One of the features of my invention consists in arranging a heat pipe to conduct heat from the heating element to the thermally sensitive resistor to provide anticipation and prevent temperature overshoot. In accordance with another feature of my invention, temperature overshoot is avoided by the use of an additional pair of thermally sensitive resistors having high temperature coefficients of resistance with one of these resistors oriented in proximity to the cooking vessel and the other resistor more remote. Thus, where there is rapid heating of the cooking utensil a relatively large differential between the resistances of these two resistors occurs. This differential in the resistances is employed as an anticipatory control to deenergize the heating unit before the preselected temperature is reached.

Figure 2:
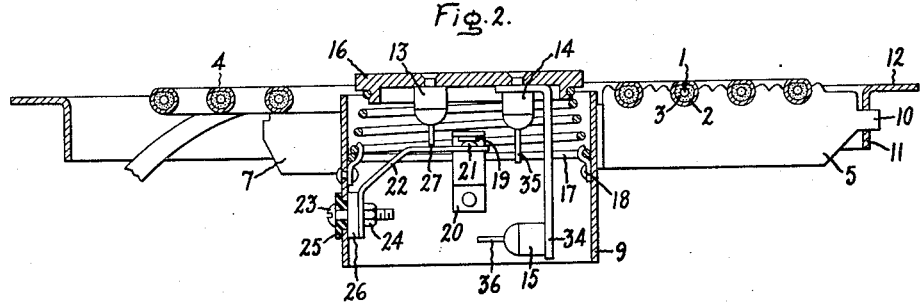

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which Fig. 1 is a bottom plan view of a heating device or unit embodying my invention; Fig. 2 is a cross-sectional view taken along the line 2—2 of Fig. 1; Fig. 3 is an enlarged cross-sectional view of a detail; Fig. 4 is a diagrammatic view of the various components and electrical connections for the automatic control; and Fig. 5 is a partial cross-sectional view similar to Fig. 2 of a modified form of my invention.

While the present invention is particularly adapted for use in conjunction with surface heating units of an electric range, I do not wish to be limited solely to this one application of my invention, since the control arrangement disclosed and claimed herein may find many other applications in various types of heating devices and electric heating units. Referring to Figs. 1 and 2 of the drawing, I have shown an embodiment of my invention arranged to control an electric heating unit of the type commonly employed for the surface heaters of an electric range. While the particular form of the heating element employed forms no part of the present invention, preferably it comprises a helical resistance conductor 1 mounted within an outer metallic sheath 2 and supported in spaced relation with reference to the outer sheath by an electrically insulating heat conducting mass 3, such as highly compressed granulated magnesium oxide. A completed heating element 4 is arranged in a spiral coil with the turns supported in spaced relation on a plurality of supporting arms such as 5, 6, and 7. The innermost end of each of these supporting arms may include a flange or foot portion such as 8 for rigid attachment to a cylindrical shell or heat barrier 9. The outer end of each of the supporting arms includes an ear 10 adapted to project through an aperture formed in a downwardly depending portion 11 of an annular flanged member 12. Flanged member 12 in turn is adapted to rest on any suitable supporting surface such as the main working surface on the top of a range.

The temperature sensitive elements, which control the extent of heating of any cooking utensil placed on heating unit 4, are mounted centrally within the heating unit and within the cylindrical heat barrier 9. As shown in Fig. 2, the present embodiment employs three temperature sensitive devices 13, 14, and 15. All of these temperature sensitive devices are carried on the underside of a metallic disk 16, which preferably is highly conductive both thermally and electrically, for example, of aluminum or copper. Disk 16 is resiliently supported with respect to the heating unit so that its upper surface normally extends slightly above the upper surface of the heating element. In the present instance, such a resilient mounting is achieved by use of a coil spring 17 attached to the heat barrier 9 by a plurality of lugs 18. Spring 17 is selected so that the lightest load presented by any cooking utensil normally used is sufficient to depress disk 16 and permit the cooking utensil to rest directly on the top surface of heating unit 4. By use of this resilient mounting, it is apparent that the thermally sensitive devices 13 and 14 are always maintained in good thermal contact with the bottom surface of a cooking vessel.

Placement of an object on the heating unit in accordance with this arrangement serves to energize heating element 4. To accomplish this, a fixed contact 19 is carried by an arm 20 riveted or otherwise secured to heat barrier 9. Movable contact 21 is carried on a resilient contact arm 22 which also is supported by heat barrier 9. Screw 23 and nut 24 for attaching contact arm 22 to shield 9 are insulated with respect to the shield by insulating washers 25 and insulating spacer 26. With this construction, whenever disk 16 is in its raised position contacts 19 and 21 are closed. However, when disk 16 is depressed, a terminal conductor 27, projecting from heat sensitive device 13 and connected to resilient arm 22, moves downwardly forcing contact 21 away from contact 19. The manner in which this action controls the energization of the heating unit appears at a later point of this disclosure.

In Fig. 3, I have shown in detail the construction of heat sensitive device 13. The thermally sensitive element itself is here shown as a cylinder 28 supported within an outer protective metallic sheath or housing 29. One of the primary prerequisites for element 28 is that its resistance must change greatly over the operating range of temperatures applicable. For example, in this particular application, the range of temperatures desirable is from approximately 150 degrees F. for warming operations, to 400 degrees F. for griddling operations. A thermally sensitive resistor, the resistance of which changes from 500 ohms to 20 ohms over this temperature range provides a very satisfactory and reliable control employing the arrangement disclosed herein. Furthermore, this element must be capable of withstanding accidental overheating temperatures as high as 1000 degrees F. It is also desirable, of course, that the assembled heat sensitive device be capable of withstanding the various mechanical shocks to which it is subjected during normal usage. In view of these various requirements, I find a thermistor particularly satisfactory for the thermally sensitive element 28, and hereinafter element 28 will be referred to as a thermistor. By this term is meant any resistance element having a resistance which varies greatly with changes in temperature. As shown in Fig. 3, the thermistor is insulated on its outer cylindrical surface by an insulating sleeve 30, and on its bottom surface by an insulating disk 31. Preferably, insulation 30 and 31 is of material such as mica, not readily affected by the higher temperatures here involved. The top surface of the thermistor is in direct contact with metallic housing 29. Housing 29 in turn may include a head portion adapted to be riveted in position in an aperture 32 provided in disk 16. The lower edge of housing 29 is rolled inwardly to compress insulating disk 31 and the upper portion of terminal wire 27 against the bottom surface of the thermistor. The assembled device may be completely sealed with a suitable molded ceramic material 33, as shown in Fig. 3. With this construction, it may be seen that one of the terminals for the thermistor comprises the outer metallic housing 29 and disk 16, which in turn are electrically grounded to the frame of the range. The other end terminal for the thermistor is formed by the conductor 27. This orientation of the thermistor makes it thermally sensitive to the temperature of disk 16 which is pressed against the bottom of any cooking utensil placed thereon. Hence, thermistor 28, as it is embodied in heat sensitive device 13, is principally sensitive to the temperature of such cooking utensil. To this same end, shield 9 reduces transfer of heat by radiation from the inside turns of heating element 4.

It should be understood at this point that thermally sensitive devices 14 and 15 are substantially identical with thermally sensitive device 13, the details of construction of which have been explained in connection with Fig. 3. Device 14 is attached to the under surface of disk 16 in a manner similar to the attachment of device 13. Device 15, however, is supported on the lower end of a bracket 34, the upper end of which is secured to disk 16. Bracket 34 preferably is metallic so that it conducts heat to thermally sensitive device 15. Since device 15 is also shielded from heat radiated by heating element 4, it is principally sensitive to such heat as is conducted by the bracket 34. When a cooking utensil of large thermal mass is placed on the heating unit, it heats up relatively slowly. Thermally sensitive device 14, of course, follows quite closely the temperature of the cooking utensil, and when the temperature of the cooking utensil rises slowly there is sufficient time for heat to travel down the bracket 34 to device 15. Hence both devices 14 and 15 remain at substantially the same temperature, and hence their resistances remain substantially the same. However, if a light thermal load is placed on the heating unit, such as a thin aluminum skillet, its temperature rises very rapidly. In view of its proximity to the bottom surface of such utensil, thermally sensitive device 14 also heats up rapidly. However, because of its remote position, there is insufficient time for heat to travel to thermally sensitive device 15 and as a result its temperature rise lags considerably the temperature rise of device 14. A fairly wide temperature differential thereby exists between device 14 and device 15. The extent of this temperature, and hence resistance, differential depends directly upon the rate of heating of the cooking utensil. The resulting resistance differential is then utilized for anticipation control to prevent temperature overshoot as appears later. As described in connection with temperature sensitive device 13, one of the terminals for each thermistor within heat sensitive devices 14 and 15 is provided by a ground connection to the frame of the range. The other terminal for device 14 is formed by the conductor 35. Likewise, conductor 36 forms a second terminal for thermally sensitive device 15.

From the above, it may be seen that automatic temperature control is achieved through the temperature responsive resistance change of device 13 and the resistance differential between devices 14 and 15. The manner in which this function is accomplished becomes clear from an examination of Fig. 4. The main heating element 4 is adapted to be connected across power supply lines 37 and 38 through a manually operated double pole single throw switch 39 and an automatically controlled switch comprising a fixed contact 40 and a movable contact 41. Movable contact 41 is carried on one of the ends of a resilient contact arm 42, the other end of which is fixed to any suitable support. With line switch 39 closed and contacts 40 and 41 closed, it may be seen that full line voltage, for example, 220 volts, is applied across the heating element so that it heats up rapidly.

Contacts 40 and 41 along with contact arm 42 may be positioned at any convenient point where they are not thermally affected by heating element 4. Contacts 40 and 41 are normally open, but are adapted to be closed by the heat responsive motion of a bimetallic strip 43, the free end of which is movable between a fixed stop 44 and the outer side of contact arm 42. Encircling the bimetallic strip is a small heating winding 45 capable of dissipating sufficient heat when energized to cause the bimetallic strip to deflect and close contacts 40 and 41. To obtain prompt responsive action of the bimetallic element, it is preferred to support its fixed end on a friction loaded pivot. As here shown, the fixed end of the bimetal has attached thereto a centrally apertured cylindrical member 46. The central aperture permits member 46 to be supported on a fixed bearing pin about which the bimetallic strip may rotate. To limit this rotation, a frictional surface 47 is prepared on the end of a resilient arm 48 attached in any suitable manner to a fixed supporting surface. This frictional engagement of surface 47 with the outer surface of cylindrical member 46 tends to restrain the pivotal movement of the bimetallic strip. Therefore, when the heater is energized, the initial heat responsive motion of the bimetallic strip consists only in a movement of the free end in a direction to close contacts 40 and 41. However, once the contacts have been closed and the desired contact pressure reached, further heat responsive motion of the bimetallic element is in the nature of a pivotal movement of its fixed end about the axis of member 46. Thereafter, when the heating winding 45 is no longer energized, cooling of the bimetallic element results in an early opening of contacts 40 and 41 without waiting for the bimetallic strip to return to its initial position. As the bimetallic element continues to cool, its free end abuts against stop 44, followed eventually by a pivotal movement of the other end of the bimetallic strip. It is therefore seen that the addition of the friction loaded pivot materially decreases the responsive time for opening or closing the contacts upon cooling or heating of the bimetallic element.

To control the supply of power to heating winding 45, a suitable gaseous discharge device 49, such as a thyratron, is employed. This circuit may be traced from a neutral 50 of the power supply through the plate circuit of the thyratron, heater 45, to the line 38. Thus, whenever the thyratron is conducting, heating winding 45 is energized to deflect the bimetallic strip and close contacts 40 and 41. The gaseous discharge device 49 may be of a convenional type including a cathode 51, cathode heater 52, anode 53, shield grid 54, and control grid 55. A capacitor 56 may be connected across lines 38 and 50 to suppress radio interference.

The control arrangement of the present embodiment is adapted for use with thermally sensitive device 13, in which the thermistor is one having a high negative temperature coefficient of resistance. Obviously, this control could be arranged to operate in response to changes in resistance of a thermistor having a high positive temperature coefficient of resistance. It may also be noted that thermally sensitive devices 14 and 15 include thermistors, both of which have either high positive or high negative temperature coefficients of resistance.

Conduction through the gaseous discharge device 49 depends upon the magnitude and phase of the potential applied to control grid 55. In accordance with this invention, the control grid is subject to a fixed grid bias, and in addition is influenced by the relative resistance of control device 13 was well as the resistance differential between control devices 14 and 15. Referring to Fig. 4, the various control voltages required are provided through the use of a transformer having its primary 57 across power supply lines 38 and 50 with three secondaries 58, 59, and 60. Secondary 58 along with a fixed resistor 61 and capacitor 62 form the fixed grid bias. Secondary 59 of this transformer is centertapped for connection in a bridge circuit with thermally sensitive device 13 and a variable resistor 63. Resistor 63 may be adjusted over a range of resistance values of substantially the same extent as the range of resistance changes occurring in temperature sensitive device 13 during use. The output from this bridge is connected across the primary 64 of a second transformer, the secondary 65 of which is connected in a manner to vary the control grid bias. It may be noted at this point that the output voltage of transformer secondary 59 is of a relatively low value, for example less than 10 volts. This permits one of the transformer terminals to be grounded safely to the frame of the range and likewise grounding of one of the terminals of the thermistor included in temperature sensitive device 13, as explained in connection with Figs. 1, 2, and 3. This arrangement also permits use of a single control conductor for connection through contact arm 22 to temperature sensitive device 13. Also, as explained in connection with Fig. 2, fixed contact 19 is grounded to the frame of the range through its mounting bracket 20 and heat barrier 9. Referring again to Fig. 4, it may be seen that whenever contacts 19 and 21 are closed, corresponding to the conditions existing when there is no cooking utensil on the heating unit, both terminals of the heat sensitive device 13 are at ground potential and hence this element appears in the circuit as having a very low resistance. However, when contacts 19 and 21 are separated in response to the placing of a vessel on the heating unit, the normal resistance of device 13 is effective as an element of the bridge circuit. In view of the low voltage employed in this bridge circuit, preferably the transformer comprising primary 64 and secondary 65 serves to amplify bridge output in the control grid biasing circuit.

Transformer secondary 60, as shown in Fig. 4, is also centertapped and connected in a bridge circuit with the resistance elements of thermally sensitive devices 14 and 15. The output of this second bridge circuit is impressed across the terminals of a transformer having a primary 66 and secondary 67. This secondary 67 along with secondaries 65 and 58 comprise the potentials connected in series with resistor 61 and capacitor 62 to determine the effective control grid bias. Transformer secondary 60 also has a relatively low voltage output permitting grounding of one terminal each of the thermally sensitive devices 14 and 15, as illustrated and explained in connection with Fig. 2. The other terminals of these devices 14 and 15 are connected respectively to the terminals of transformer secondary 60. Also, the output of this second bridge circuit may be amplified to vary the grid bias through the transformer comprising primary 66 and secondary 67.

Assuming that contacts 19 and 21 are open in the first bridge circuit, when the impedance of adjustable resistor 63 and the impedance of temperature sensitive device 13 are identical, the bridge is balanced and no potential is applied across the terminals of transformer primary 64. Likewise, in the second bridge circuit, when the resistances through temperature sensitive devices 14 and 15 are identical the bridge is balanced and no potential is applied across the terminals of transformer primary 66. Under these conditions, the circuit components making up the fixed grid bias are selected so that the control grid 55 of thyratron 49 is at the critical cutoff value, and hence no conduction occurs through the thyratron. This of course means that heating winding 45 is ineffective to operate the bimetallic strip and close contacts 40 and 41 in the main heater circuit. However, should the resistance through thermally sensitive device 13 rise due to a decrease in temperature, the first bridge becomes unbalanced resulting in a phase and magnitude shift of the control grid biasing voltage in a manner to cause thyratron 49 to conduct and hence effect a closure of contacts 40 and 41. Furthermore, it may be seen that if a cooking utensil is removed from the heating unit, thus permitting closure of contacts 19 and 21, thermally sensitive device 13 is short-circuited having the same effect on the first bridge as a very high temperature of device 13. Under these conditions, the first bridge is unbalanced in the opposite direction to bias the control grid of the thyratron well beyond its critical cutoff value to prevent conduction through the thyratron and heating windings. Hence, whenever there is no weight on the heating unit effective to separate contacts 19 and 21, heating unit 4 remains deenergized. Adjustable resistor 63 may be varied in any suitable manner, for example by a control knob located at a convenient point with respect to the range. Preferably the variable or adjustment member is calibrated in degrees F. or in cooking operations to enable an operator to preselect the desired temperature to which a cooking utensil is to be heated. To energize heating unit 4 after the preselected temperature has been set and line switch 39 closed, it is merely necessary to place the cooking utensil on the heating unit and thus open contacts 19 and 21. Initially, of course, the resistance of device 13 is relatively high since it has been assumed that it has a negative temperature coefficient. Therefore, the first bridge is initially unbalanced in a direction to supply a control grid voltage effective to fire gaseous discharge device 49. The resultant heating effect through heater 45 deflects bimetallic strip 43, closing contacts 40 and 41 to energize heating element 4. As the temperature of device 13 rises, its resistance decreases until the point is reached where the first bridge becomes balanced at which time further conduction through the thyratron is prevented by the fixed bias on the control grid. A cycling action thereafter takes place to maintain the cooking utensil at a substantially uniform temperature.

Anticipation control to prevent temperature overshoot is provided by the second bridge which includes the temperature sensitive devices 14 and 15. So long as the temperature of both devices 14 and 15 is the same, their resistances are equal and hence this second bridge is balanced. However, if a temperature differential exists between devices 14 and 15, a corresponding resistance differential occurs to unbalance this bridge. As explained above, if a cooking utensil is heated up rapidly, device 14 closely follows the temperature rise of such utensil, but device 15, due to its remote location, rises in temperature more slowly. The extent of the temperature differential and hence resistance differential depends directly upon the rate of heating. As may be seen from Fig. 4, the resulting unbalance of the second bridge due to such a resistance differential is effective through transformer primary 66 and its secondary 67 to bias control grid 55 to its cutoff value prior to arrival at the preselected temperature as determined by the first bridge and temperature sensitive device 13. It may be noted that this anticipation control provided by the second bridge is effective mainly during the initial heating up period. Thereafter, devices 14 and 15 approach the same temperature and are then no longer effective. Thereafter, temperature control is principally under the influence of temperature sensitive device 13.

In Fig. 5 of the drawing, I have shown a modified form of anticipation control to prevent temperature overshoot. Many of the elements are identical with those in the previously described embodiment. For convenience, I have utilized the same number symbols to designate the same components. It is also to be understood that the wiring diagram (Fig. 4) and manner of operation for this embodiment are identical with the exception that transformer secondary 60, thermally sensitive devices 14 and 15, and the transformer comprising primary 66 and secondary 67 are eliminated. Referring to Fig. 5, I have shown a partial cross-sectional view similar to Fig. 2 with the temperature controlling elements oriented centrally within a heating unit of the same type as described above. Likewise, a temperature sensitive device 13 of the form shown by Fig. 3 is carried by a thermally conductive disk 16 resiliently mounted on a coil spring 17. Again, the thermally sensitive device is shielded from heat radiated by the heating element by way of a cylindrical heat barrier 9. In addition, I have provided fixed and movable contacts 19 and 21, respectively, which are mounted and which function in a manner identical with the previously described arrangement.

However, in the embodiment shown by Fig. 5, I have eliminated temperature sensitive devices 14 and 15 which provided the anticipation control. In lieu thereof, a heat pipe 68 is employed, with one of its ends secured, as by welding, to a convenient point on heating element 4 and its other end secured to the outer metallic casing 29 of thermally sensitive device 13. Heat pipe 68 may be in the form of a flexible cable of a highly conductive material, such as copper or aluminum, so that it conveys heat from the heating element to the thermally sensitive device tending normally to heat it up above the temperature which it would reach if influenced by the temperature of the cooking vessel alone.

It is found in operation of electric heating units of this general type that the heating unit rises in temperature much more rapidly than a cooking utensil resting on the heating unit. Furthermore, the heating element reaches a much higher ultimate temperature after continuous operation. By the use of this heat pipe additional heat is supplied to device 13 tending to raise its temperature. However, if the cooking vessel being heated presents a large thermal mass, necessarily resulting in slow temperature rise, most of the heat conducted through the heat pipe is conducted on through disk 16 to the cooking vessel because of its lower temperature. When a lighter thermal mass is presented by the cooking utensil and its contents, the cooking utensil rises in temperature much more rapidly. However, even under these circumstances the outer sheath of the heating element rises to an even higher temperature, whereby heat is conducted through the heat pipe to the temperature sensitive device. But in this instance, where it is highly desirable to prevent temperature overshoot, the higher temperature of the utensil reduces the rate of conduction from device 13 through disk 16. Therefore, with this relatively light load on the heating unit, heat flow from the heat pipe to the temperature sensitive device results in a relatively large temperature differential of device 13 above utensil temperature. The control, as described above in connection with Fig. 4, thus turns off the heat relatively far below the control point preselected whereby the coasting effect due to the residual heat stored in the heating unit brings such utensil up to the preselected temperature.

From the above disclosure, it may be seen that I have provided an improved automatic temperature control which not only maintains a cooking vessel at a uniform preselected temperature, but which also anticipates arrival of a cooking vessel at this temperature to allow for the additional heating effect occurring after the heating unit is turned off. This construction thereby permits use of a heating element with a high rate of heating to bring the pan or other cooking vessel quickly to the desired cooking temperature. Regardless of the type utensil used or the extent of the thermal mass presented, temperature is raised during the initial cycle from room temperature to the preselected temperature without danger of overshooting this temperature or the experiencing of time consuming delays by failure to reach the preselected temperature on the first cycle of operation. It further may be seen that the controlling elements, which are subjected to the intense heat of the heating unit, involve no moving parts which might become inoperative due to such temperatures or from fouling by food substances during cooking. In fact, such moving parts as are involved in the control may be located at remote points within the range or elsewhere where they may be adequately protected from heat and foreign substances to insure their reliability and long operating life.

While the present invention has been described by reference to particular embodiments thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a cooking appliance, an electric heating unit comprising a plurality of spaced apart spiral turns, the innermost turn defining a central opening, a disk positioned in said opening for engagement with the bottom of a cooking vessel placed on the heating unit, said disk being formed from a material of high heat conductivity, a first thermistor mechanically connected to said disk in direct intimate contact therewith, a second thermistor mechanically connected to said disk in direct intimate contact therewith, a third thermistor, a bracket of heat conducting material mechanically connecting said third thermistor to said disk in spaced relation thereto and through which heat is conducted from said disk to said third thermistor, said bracket defining a heat path of restricted flow between said disk and said third thermistor, an electric switch controlling flow of current to said heating unit, and electric circuit means responsive to changes in the resistance of said first thermistor and to changes in the difference in resistance between said second and third thermistors for effecting actuation of said electric switch.

2. In a cooking appliance, an electric heating unit comprising a plurality of spaced apart spiral turns, the innermost turn defining a central opening, a disk positioned in said opening for engagement with the bottom of a cooking vessel placed on the heating unit, said disk being formed from a material of high heat conductivity, a first thermistor mechanically connected to said disk in direct intimate contact therewith, a second thermistor mechanically connected to said disk in direct intimate contact therewith, a third thermistor, a bracket of heat conducting material mechanically connecting said third thermistor to said disk in spaced relation thereto and through which heat is conducted from said disk to said third thermistor, said bracket defining a heat path of restricted flow between said disk and said third thermistor, an electric switch controlling flow of current to said heating unit, a first bridge circuit in which said first thermistor is connected and in which its resistance forms a variable element, a second bridge circuit in which said second and third thermistors are connected and in which the difference between their resistances forms a variable element, and means responsive to the combined output of both said bridge circuits for effecting actuation of said electric switch.

3. In a cooking appliance, an electric heating unit comprising a plurality of spaced apart spiral turns, the innermost turn defining a central opening, a disk positioned in said opening for engagement with the bottom of a cooking vessel placed on the heating unit, said disk being formed from a material of high heat conductivity, a first thermistor mechanically connected to said disk in direct intimate contact therewith, a second thermistor mechanically connected to said disk in direct intimate contact therewith, a third thermistor, a bracket of heat conducting material mechanically connecting said third thermistor to said disk in spaced relation thereto and through which heat is conducted from said disk to said third thermistor, said bracket defining a heat path of restricted flow between said disk and third thermistor, a heat barrier positioned between the heating unit turns and said thermistors to shield them from the heating unit, an electric switch controlling flow of current to said heating unit, and electric circuit means responsive to changes in the resistance of said first thermistor and to changes in the difference in resistance between said second and third thermistors for effecting actuation of said electric switch.

JAMES F. YOUNG.

REFERENCES CITED

The following references are of record in the file of this patent:

UNITED STATES PATENTS

| Number | Name | Date |
|---|---|---|
| 1,946,155 | Foster | Feb. 6, 1934 |
| 2,140,479 | Meyers et al. | Dec. 13, 1938 |
| 2,148,407 | Pierson | Feb. 21, 1939 |
| 2,207,871 | Myers | July 16, 1940 |
| 2,265,684 | Campbell | Dec. 9, 1941 |
| 2,272,492 | Weyher | Feb. 10, 1942 |
| 2,288,510 | Brannon | June 30, 1942 |
| 2,303,012 | Weber et al. | Nov. 24, 1942 |
| 2,399,423 | Bletz | Apr. 30, 1946 |
| 2,413,128 | Wills | Dec. 24, 1946 |
| 2,423,541 | Wilson et al. | July 8, 1947 |
| 2,427,945 | Clark | Sept. 23, 1947 |
| 2,488,580 | Burleigh | Nov. 22, 1949 |
| 2,510,040 | Rudahl | May 30, 1950 |
| 2,510,041 | Rudahl | May 30, 1950 |
| 2,556,065 | Callender | June 5, 1951 |